United States Patent
Goodwin et al.

(12) 
(10) Patent No.: US 6,473,856 B1
(45) Date of Patent: Oct. 29, 2002

(54) GOLD CODE BACKUP FOR CORRUPT BOOT CODE RECOVERY

(75) Inventors: Joel Gerald Goodwin; Yi-Ming Ku; John Steven Langford, all of Austin; Michael Y. Lim, Leander, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,455

(22) Filed: Jun. 30, 1999

(51) Int. Cl.[7] .............................................. G06F 9/445
(52) U.S. Cl. .......................................................... 713/2
(58) Field of Search ........................................ 713/1, 2

(56) References Cited

U.S. PATENT DOCUMENTS

| | | | | |
|---|---|---|---|---|
| 5,388,267 A | * | 2/1995 | Chan et al. ..................... | 713/2 |
| 6,272,628 B1 | * | 8/2001 | Aquilar et al. .................. | 713/2 |
| 6,289,449 B1 | * | 9/2001 | Aquilar et al. .................. | 713/2 |

\* cited by examiner

Primary Examiner—Thomas M. Heckler
(74) Attorney, Agent, or Firm—Joseph P. Lally; Mark E. McBurney

(57) ABSTRACT

A computer system including a central processing unit and a system memory accessible to the central processing unit via a host bus. A primary non-volatile storage element and a backup non-volatile storage element are incorporated into the system's motherboard. The primary non-volatile storage element contains the system's boot code that is executed following a reset or power on event. The backup non-volatile storage element contains a restoration sequence that is suitable for reprogramming a first portion of the boot code in the primary non-volatile storage element. A jumper block on the motherboard determines which of the non-volatile storage elements is initially addressed following a power on event. Preferably, the first portion of the boot code comprises the system's boot block or gold code and includes a sequence for downloading and reprogramming remaining portions of the boot code. The primary non-volatile storage element is preferably implemented as a multiple sector flash memory device. In one embodiment, the gold code is stored in a first sector of the flash module and the update code is stored in remaining sectors.

16 Claims, 3 Drawing Sheets

GOLD CODE BACKUP FOR CORRUPT BOOT CODE RECOVERY

BACKGROUND

1. Field of the Present Invention

The present invention generally relates to the field of computer systems and more particularly to restoring functionality to a system after critical portions of the system's boot code have been corrupted.

2. History of Related Art

Computer system architectures typically utilize a flash memory module to store the initial program load code. The initial program load code, also referred to in this disclosure as the boot code, is the first code to be executed by the system following a system reset. The boot code is *responsible for initializing and configuring many of the computer system's operational parameters. Flash memory modules are popular for storing the boot code because they provide the combined advantage of non-volatility and easy programmability. Non-volatility is required for flash code storage since the flash code must be available when power is restored. Programmability is also highly desirable because flash codes are typically updated or otherwise altered after the computer system has been shipped. When a revised version of the flash code is available, a user of the computer system can download the updated flash code and reprogram the flash memory module with the updated code. Typically, the code responsible for reprogramming the flash memory module is stored in the flash memory itself. Conventional flash memory devices are divided into smaller blocks frequently referred to as sectors, wherein each sector is individually erasable (i.e., Sector A may be erased without erasing the contents of Sectors B, C, etc.). Typically, a base or initial sector is programmed with a core portion of the boot code referred to herein as the boot block or gold code. The gold code typically includes the initialization and configuration code referred to above in addition to the code required to download and update the remaining sectors of the flash module. It will be appreciated that any code residing in the same sector as the gold code cannot be reprogrammed without erasing the gold code itself. For this reason, it is highly desirable to locate the majority of the flash code in sectors of the flash memory module other than the gold code sector whereas the gold code it best suited for only highly essential and stable code. When this convention is followed, updating the gold code should be an extremely rare event.

Unfortunately, flash memory devices are susceptible to corruption for a variety of reasons. Assuming that the likelihood of any sector in a flash memory device becoming corrupted is essentially the same, it will be appreciated that most, but not all, errors that occur in the flash module are recoverable. More specially, if any sector of the flash module other than the sector containing the gold code becomes corrupted, the corruption is non-fatal since the gold code contains sufficient functionality to reprogram the remaining sectors of the flash module. If, however, the gold code sector is corrupted the error is fatal since the module will be unable to reprogram itself. The flash memory module is typically soldered directly to the motherboard of the computer system to avoid the unnecessary cost and complexity associated with adding a socket to the motherboard. This is especially true in the case of commercially distributed flash memory devices, which are typically packaged in BGA or SOP packages that are difficult and costly to socket. When the gold code sector of a flash memory module that is affixed to the motherboard becomes corrupted, the motherboard must usually be returned to the manufacturer for replacement of the flash module. The cost and time associated with repairing a corrupt flash module in this fashion is typically unacceptable. Accordingly, it would be highly desirable to address the problem of recovering from a corrupt gold code sector in a flash memory module without significantly increasing the cost or complexity of the overall system.

SUMMARY OF THE INVENTION

The problems identified above are in large part addressed by incorporating a backup storage element into the design of the system motherboard. The backup storage element contains sufficient code to reprogram the gold code in the primary storage element. When critical sections of the primary storage element become corrupted, the system is configured to execute the code stored in the backup element thereby restoring the primary storage element to a minimum level of functionality sufficient to enable the system to download remaining portions of the boot code into the primary storage element.

Broadly speaking the present invention contemplates a computer system and its associated motherboard. The system includes a central processing unit and a system memory that is accessible to the central processing unit via a host bus. The system further includes a bus bridge coupled between the host bus and an I/O bus and one or more I/O peripheral device coupled to the I/O bus. A primary non-volatile storage element and a backup non-volatile storage element are incorporated into the system's motherboard. The primary non-volatile storage element contains the system's boot code that is executed following a reset or power on event. The backup non-volatile storage element contains a restoration sequence that is suitable for reprogramming a first portion of the boot code in the primary non-volatile storage element. A jumper block on the motherboard determines which of the non-volatile storage elements is initially addressed following a power on event.

Preferably, the first portion of the boot code comprises the system's boot block or gold code and includes a sequence for downloading and reprogramming remaining portions of the boot code. The primary non-volatile storage element is preferably implemented as a multiple sector flash memory device or module suitable for its programmability and non-volatility. In one embodiment, the gold code is stored in a first sector of the flash module while remaining portions of the boot code (referred to herein as the update code) are stored in remaining sectors. Preferably, the restoration sequence of the backup non-volatile storage element includes code sufficient to reprogram the gold code portion of the primary non-volatile storage element. In one embodiment desirable for its low cost and reliability, the backup non-volatile storage element comprises a conventional, mask-programmed ROM preferably packaged in a low cost, low profile package such as a PLCC. The ROM device may be housed in a socket to provide field interchangeability. In one embodiment, the backup non-volatile storage device includes a compressed copy of the first portion of the boot code and a decompression algorithm that is adapted to unpack the compressed copy of the first portion and program or store the decompressed code in the primary non-volatile storage element.

The present invention further contemplates a method of restoring a corrupted flash memory module in a computer system. After determining that a flash memory module is corrupted and shutting off the main system power, a setting on a motherboard of a computer is altered to indicate that the flash module needs to be restored. After power is restored to the system, the altered motherboard setting is detected thereby causing the system to execute a restoration sequence stored in a backup non-volatile storage element. The restoration sequence restores a first portion of the flash memory. Preferably, the step of altering the motherboard setting is accomplished by reconfiguring a jumper setting on the motherboard to indicate the backup non-volatile storage element as containing the first address location executed by the computer system following a power on event. In one embodiment, the step of restoring the first portion of the flash memory module comprises programming an initial sector of the flash memory module with the system's gold code. The restoration of the initial sector is preferably achieved by decompressing a compressed copy of a the system's gold code stored in the backup storage element and programming the initial sector of the flash module with the gold code. The method may further include the step of using the restored first portion of the flash memory module to restore remaining portions of the flash memory module such that, once the initial sector has been restored, the flash module is capable of downloading and restoring the remaining portions of its code.

BRIEF DESCRIPTION OF THE DRAWINGS

Other objects and advantages of the invention will become apparent upon reading the following detailed description and upon reference to the accompanying drawings in which.

Figure 1:
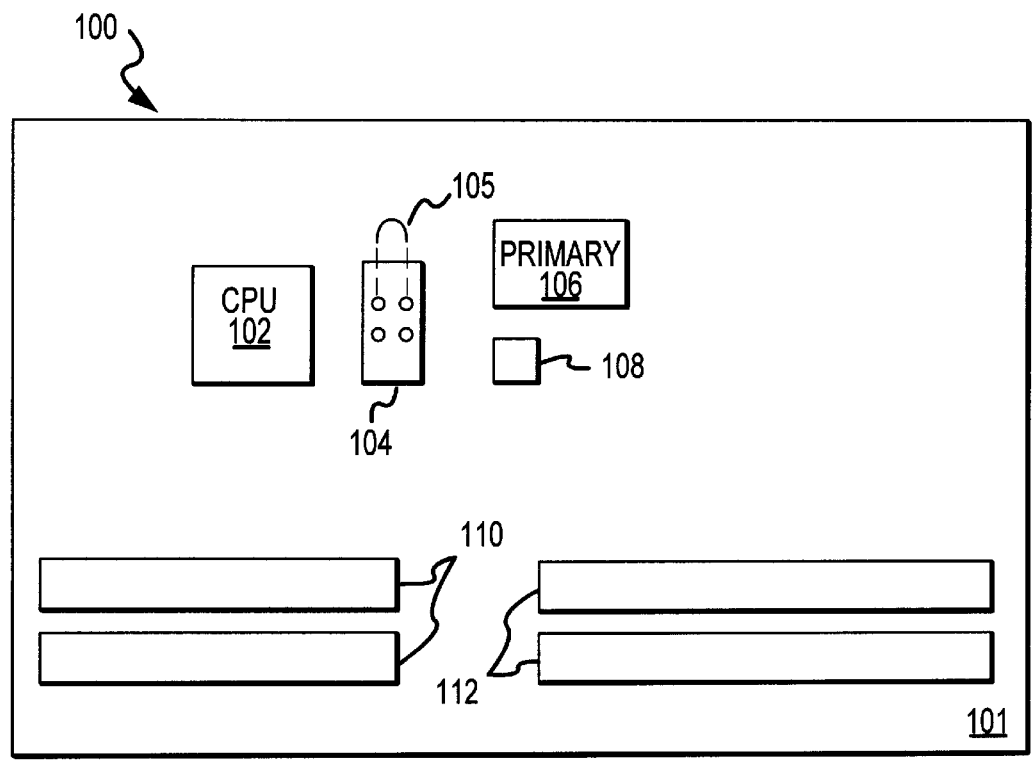
FIG. 1 is a simplified block diagram of a motherboard according to the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 is a simplified diagram of a motherboard 100 according to the present invention. Motherboard 100 includes a printed circuit card 101 suitably comprised of a laminated epoxy material on which a pattern of conductive interconnects (not shown) are fabricated according to well known printed circuit card manufacturing techniques. Attached to circuit card 101 are a number of components including various integrated circuit devices (also referred to herein as modules), discrete components, connectors, and various other components. The embodiment of motherboard 101 depicted in FIG. 1 includes a central processing unit (CPU) 102 suitable for executing computer instructions. Although the depicted embodiment of motherboard 100 indicates a single CPU 102, other embodiments may include two or more CPUs 102 in a multiprocessing application of the invention. In addition, it will be appreciated that another embodiment of the invention may replace CPU 102 with a connector suitable for receiving a processor card on which multiple CPUs 102 are attached.

In addition to CPU 102, the embodiment of motherboard 100 shown includes one or more memory connectors 110 and one or more expansion slots 112. Memory connectors 110 are suitable for receiving memory modules that provide the system memory to the computer system in which motherboard 100 resides. Expansion slots 112 provide connectors for expansion adapters and other I/O cards as will be familiar to those knowledgeable in the field of microprocessor based computer systems. In an embodiment of motherboard 100 for use in server or network systems, a single memory socket 110 may receive a memory card to which multiple memory modules are attached and, similarly, a single expansion card socket 112 may provide for an expansion board that receives multiple expansion or I/O adapters.

Figure 3:
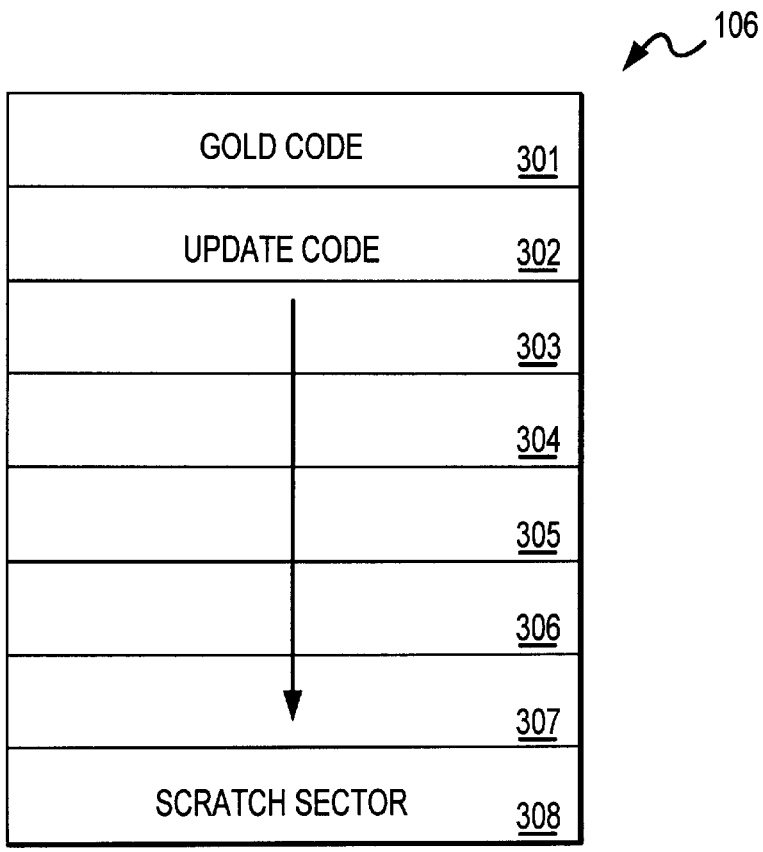
FIG. 3 is a representation of a primary non-volatile storage element for use with the present invention.
Figure 4:
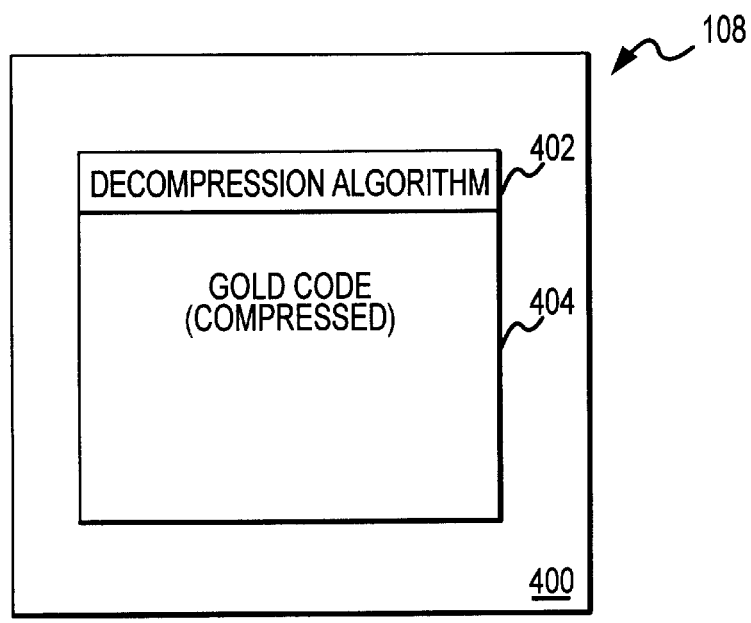
FIG. 4 is a representation of a backup non-volatile storage element for use with the present invention.

Motherboard 100 according to the present invention includes a primary non-volatile storage element 106 and a backup non-volatile storage element 108. The primary non-volatile storage element 106, as its name suggests, is a memory device suitable for retaining information or data between power tenures such that the information or data stored in primary non-volatile storage element 106 when power to computer system 200 (shown in FIG. 2) is terminated is available when power is restored. In the preferred embodiment, primary non-volatile storage element 106 contains the boot code for computer system 200. The boot code contains sufficient code to transition computer system 200 to a functional state after power is applied to the computer system. In one embodiment, the boot code stored in primary non-volatile storage element 106 includes a gold code portion that is stored in one physical portion of primary non-volatile storage element 106 and an update portion that is stored in remaining portions of primary non-volatile storage element 106. The gold code portion of the boot code contains the minimum code necessary to verify and configure the initial state of computer system 200. In addition, the gold code portion of the boot code stored in primary non-volatile storage element 106 preferably includes sufficient functionality to program the remaining portions of primary non-volatile storage element 106. The remaining portions of the boot code, which are collectively referred to in this disclosure as the update portion of the boot code provide additional functionality to the computer system. The update portion of the boot code might, for example, be responsible for retrieving an operating system from disk and loading it into system memory. Referring momentarily to FIG. 3, an embodiment of primary non-volatile storage element 106 is represented. In the depicted embodiment, primary non-volatile storage element 106 includes eight sectors (identified by reference numerals 301 through 308). An initial sector 301 of primary non-volatile storage element 106 is configured with the gold code for the computer system while sectors 302 through 307 are utilized for the update code and the eighth sector 308 is used as a scratch sector. In the preferred embodiment, primary non-volatile storage element 106 is implemented as a flash memory module affixed directly to motherboard 100. Attaching primary non-volatile storage element 106 directly to motherboard 100 eliminates the need for a large, expensive, and relatively fragile socket that would be necessary to receive any of the packages in which commercially distributed flash memory devices are commonly available. Returning now to FIG. 1, motherboard 100 further includes a backup non-volatile storage element 108. The backup non-volatile storage element 108 is configured with code that is suitable for programming a portion of the boot code in primary non-volatile storage element 106 to provide a recovery mechanism if primary non-volatile storage element 106 becomes corrupted in such a manner that primary non-volatile storage element 106 is unable to reprogram itself. In the preferred embodiment, the backup non-volatile storage element is designed to reprogram initial sector 301 of primary non-volatile storage element 106 with the system's gold code. By providing the means to restore the gold code, the invention contemplates the ability to recover from an error condition that previously required an expensive field service event followed typically by a time consuming replacement of the boot code storage device by the manufacturer. Referring to FIG. 4, an embodiment of backup non-volatile storage element 108 according to the invention is illustrated. In the depicted embodiment, backup non-volatile storage element 108 includes a compressed copy 404 of the system's gold code and a decompression algorithm 402. When executed, decompression algorithm 402 unpacks or uncompresses the compressed copy 404 of the and programs first sector 301 of primary non-volatile storage element 106 with the uncompressed gold code. Once a valid copy of the gold code is present in first sector 301 of primary non-volatile storage element 106, control can be transferred to primary non-volatile storage element 106 by powering off the system, returning jumper 105 to its original configuration and powering on the system. Primary non-volatile storage element 106 will then execute the gold code to reload remaining portions of the device with the update code. Compressing the gold code in backup non-volatile storage element 108 enables the code to fit into a smaller quantity of memory thereby permitting the use of a smaller and less expensive memory device for backup non-volatile storage element 108. In one embodiment desirable for its low cost, backup non-volatile storage element 108 is implemented as a mask defined read only memory (ROM) identified in FIG. 4 by reference numeral 400. In one exemplary embodiment, the gold code portion of the boot code stored in primary non-volatile storage element 106 consumes approximately 1 MB of memory while the compressed version of the gold code stored in backup non-volatile storage element 108 consumes 500 KB of memory or less. ROM device 400 is preferably packaged in a PLCC or other such suitable package desirable for its low cost, low profile, and small footprint. In one embodiment, additional flexibility is achieved by including a socket (not indicated in FIG. 1) suitable for receiving ROM 400. By socketing ROM 400, additional assurance is provided in the event that ROM 400 becomes corrupted or otherwise non-functional. Moreover, the socket part required for a relatively small an inexpensive package such as the PLCC package is significantly less expensive and more reliable than a socket for a flash memory module package such as the BGA, SSOP, or TSOP package configurations common for such devices.

Figure 5:
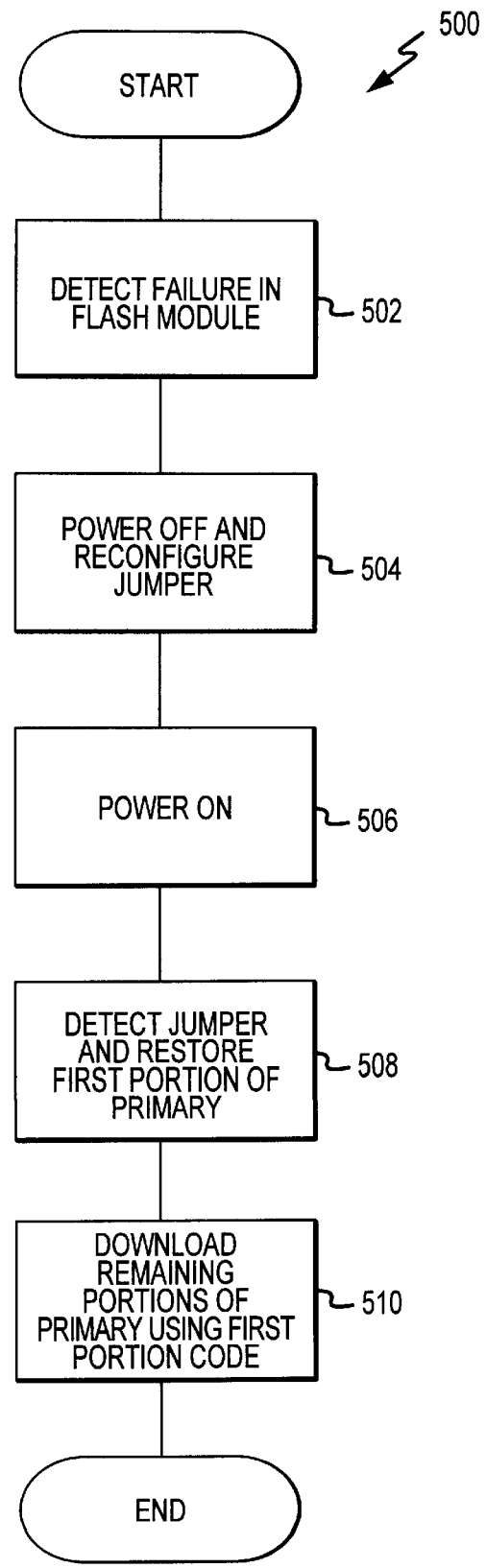
FIG. 5 is flow diagram of a method of restoring a corrupted flash module according to the present invention.

Returning to FIG. 1, motherboard 100 includes means for identifying either primary non-volatile storage element 106 or backup non-volatile storage element 108 as the device to be initially addressed following a power on event. In the depicted embodiment, the identification means includes a jumper block identified in FIG. 1 by reference numeral 104. Altering the configuration of the jumper 105 within jumper block 104 alters the location of the first address executed by the computer system following a power on event. In normal operation, with jumper 105 in a first configuration within jumper block 104, primary non-volatile storage element 106, and more specifically, gold code sector 301, is addressed immediately following a power on event. If jumper 105 is configured in a second configuration within jumper block 104, however, backup non-volatile storage element 108 is addressed immediately following a power reset. Using jumper block 104, then, a user of the system that is faced with a corrupted gold code sector in primary non-volatile storage element 106 can simply turn off the system power and reconfigure jumper 105 in jumper block 104. When power is restored to the system, the reconfigured jumper block setting is detected and execution begins with the code stored in backup non-volatile storage element 108. In the embodiment depicted in FIG. 4, a compressed copy of the gold code is unpacked and programmed into first sector 301 of primary non-volatile storage element 106 thereby restoring primary non-volatile storage element 106 to a state from which the remaining sectors of primary non-volatile storage element 106 can be loaded. The method described herein is depicted in the flow diagram of FIG. 5. After a failure in primary non-volatile storage element 106 is detected (step 502), the system is powered off and the jumper reconfigured (step 504). Following reconfiguration of the jumper, power is restored to the system (step 506). The reconfigured jumper is detected after power on thereby forcing execution of the backup non-volatile storage element 108 code to restore a first portion of the boot code in primary non-volatile storage element 106. After the first portion of primary non-volatile storage element 106 is restored from backup non-volatile storage element 108 jumper 105 can be restored to its original configuration within jumper block 104. Then, after powering on the system, remaining portions of the boot code can be restored from primary non-volatile storage element 106 using the first portion of the boot code. Preferably, the first portion of the boot code that is restored by backup non-volatile storage element 108 includes only the gold code portion of the boot code to minimize the storage capacity requirements of backup non-volatile storage element 108.

Figure 2:
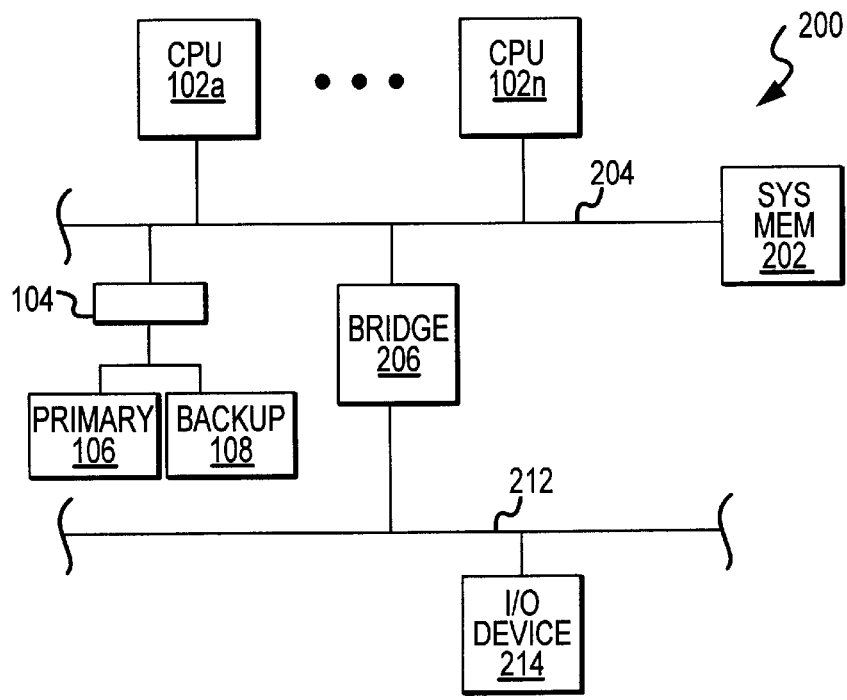
FIG. 2 is a simplified block diagram of a computer system according to the present invention.

Turning now to FIG. 2, a computer system 200 according to the present invention is presented. In the depicted embodiment, system 200 includes one or more CPUs 102a . . . 102n interconnected via a host bus 204. A system memory 202 is accessible to CPUs 102 via the host bus 204. The primary non-volatile storage element 106 and the backup non-volatile storage element 108 are accessible to CPUs 102 via host bus 204 and jumper block 104. Dependent on the configuration of jumper block 104, CPUs 102 execute code stored in either primary non-volatile storage element 106 or backup non-volatile storage element 108 following a power on event as discussed previously. System 200 further includes a bus bridge 206 coupled between host bus 204 and a peripheral or I/O bus 221. One or more I/O devices are attached to I/O bus 214. Suitable I/O bus architecture choices for I/O bus 212 might include the ISA, EISA, PCI, AGP, and MCA architectures familiar to those in the field of microprocessor based computer systems while suitable I/O devices might include keyboards, pointing devices, disk drives, display terminals, graphics adapters, audio cards, network controllers, and the like. Utilizing the backup non-volatile storage element 108 in connection with jumper block 104 as discussed previously, system 200 eliminates the need to dismantle and ship the computer system motherboard to the manufacturer when the gold code becomes corrupted thereby beneficially reducing maintenance overhead and improving customer satisfaction.

It will be apparent to those skilled in the art having the benefit of this disclosure that the present invention contemplates recovering from a corrupted flash memory module using a low cost backup module used to store and reprogram the gold code in the flash module to avoid the necessity of returning the system motherboard to the manufacturer. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A computer system, comprising:

a central processing unit;

a system memory accessible to the central processing unit via a host bus;

a primary non-volatile storage element configured with boot code comprising a boot block portion and an update portion, wherein the boot block portion is enabled to download the update portion;

a backup non-volatile storage element configured with a restoration sequence suitable for reprogramming the boot block portion of the boot code in the primary non-volatile storage element;

a jumper block suitable for determining which of the non-volatile storage elements is initially addressed following a power on event;

a bus bridge coupled between the host bus and an I/O bus; and at least one I/O peripheral device coupled to the I/O bus.

2. The computer system of claim 1, wherein the primary non-volatile storage element comprises a multiple sector flash memory device and wherein the boot block is stored in a first sector exclusively and the update code is stored in remaining sectors.

3. The computer system of claim 1, wherein the backup non-volatile storage device includes a compressed copy of the boot block and wherein the restoration sequence includes an algorithm suitable for decompressing the compressed copy of the boot block and storing the decompressed copy in the primary non-volatile storage element.

4. The computer system of claim 1, wherein the backup non-volatile storage device comprises a ROM.

5. The computer system of claim 4, wherein the ROM is packaged in a PLCC package received within a socket.

6. A motherboard, comprising:

a central processing unit;

a primary non-volatile storage element configured with boot code comprising a boot block portion and an update portion, wherein the boot block portion is enabled to download the update portion;

a backup non-volatile storage element configured with a restoration sequence suitable for reprogramming the boot block portion of the boot code in the primary non-volatile storage element; and means for determining which of the non-volatile storage elements is initially addressed by the central processing unit following a power on event.

7. The motherboard of claim 6, wherein the primary non-volatile storage element comprises a multiple sector flash memory device wherein the boot block is stored exclusively in a first sector and the update code is stored in remaining sectors.

8. The motherboard of claim 6, wherein the backup non-volatile storage device includes a compressed copy of the boot block and wherein the restoration sequence includes an algorithm suitable for decompressing the compressed copy of the boot block and storing the decompressed copy in the primary non-volatile storage element.

9. The motherboard of claim 6, wherein the means for determining the addressed storage element comprises a jumper block.

10. The motherboard of claim 6, wherein the backup non-volatile storage device comprises a ROM.

11. The motherboard of claim 10, wherein the ROM is packaged in a PLCC package received within a socket.

12. A method of restoring a corrupted flash memory module in a computer system, comprising:

altering a setting on a motherboard of a computer to indicate that the flash memory module is corrupted;

powering on the computer system;

detecting the altered motherboard setting and, responsive thereto, executing a restoration sequence stored in a backup non-volatile storage element, wherein the restoration sequence restores a boot block portion of the system's boot code to a first portion of the flash memory; and executing the restored boot block portion to restore remaining portion of the system's boot code.

13. The method of claim 12, wherein the step of altering the motherboard setting comprises reconfiguring a jumper block setting on the motherboard to indicate the back non-volatile storage element as the non-volatile storage element containing the first address location executed by the computer system following a power on event.

14. The method of claim 12, wherein the step of restoring the boot block portion of the flash memory module comprises programming an initial sector of the flash memory module.

15. The method of claim 2, wherein the step of restoring the boot block portion of the flash memory module includes decompressing a compressed copy of the boot block portion of the flash memory module.

16. The method of claim 12, wherein the step of restoring the boot block portion of the flash memory model comprises downloading a second portion of a boot code sequence to the flash memory module.

* * * * *